US012604152B2

(12) United States Patent
Tyagi et al.

(10) Patent No.: US 12,604,152 B2
(45) Date of Patent: Apr. 14, 2026

(54) BINARUAL RENDERING

(71) Applicants: Dolby Laboratories Licensing Corporation, San Francisco, CA (US); DOLBY INTERNATIONAL AB, Dublin (IE)

(72) Inventors: Rishabh Tyagi, Sydney (AU); Stefan Bruhn, Sollentuna (SE); Juan Felix Torres, Redfern (AU)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 40 days.

(21) Appl. No.: 18/436,010

(22) Filed: Feb. 7, 2024

(65) Prior Publication Data

US 2024/0196156 A1 Jun. 13, 2024

Related U.S. Application Data

(60) Provisional application No. 63/386,465, filed on Dec. 7, 2022.

(51) Int. Cl.

*H04S 7/00* (2006.01)
*G10L 19/008* (2013.01)
*H04S 3/00* (2006.01)

(52) U.S. Cl.

CPC ............ *H04S 7/304* (2013.01); *G10L 19/008* (2013.01); *H04S 3/008* (2013.01); *H04S 2400/01* (2013.01);

(Continued)

(58) Field of Classification Search

CPC ...... H04S 7/304; H04S 3/008; H04S 2400/01; H04S 2400/03; H04S 2400/11; G10L 19/008

See application file for complete search history.

(56) References Cited

U.S. PATENT DOCUMENTS 6,259,795 B1 7/2001 McGrath
6,331,851 B1 12/2001 Suzuki (Continued)

FOREIGN PATENT DOCUMENTS

CA 3044260 A1 11/2020
GB 2601805 A 6/2022

(Continued)

OTHER PUBLICATIONS

3GPP TR 26.928 V17.0.0 (Apr. 2022). 3rd Generation Partnership Project; Technical Specification Group Services and System Aspects; Extended Reality (XR) in 5G (Release 17). 131 pages.

(Continued)

*Primary Examiner* — Hai Phan

(57) ABSTRACT

An aspect of the present disclosure relates to processing audio comprising decoding a first bitstream ($b_1$) to obtain decoded immersive audio content (A), decoding a second bitstream ($b_p$) to obtain pose information (P, V, V') associated with a user of a lightweight processing device, determining a first head-pose (P') based on the pose information, providing a downmix representation (Dmx) of the immersive audio content (A) corresponding to the first head pose (P'), rendering a set of binaural representations ($BIN_n$) of the immersive audio content (A), wherein the binaural representations correspond to a second set of head poses ($P_n$), computing reconstruction metadata (M) to enable reconstruction of the set of binaural representations from the downmix representation (Dmx), the metadata (M) including the first head pose (P'), and encoding the downmix representation (Dmx) and the reconstruction metadata (M) in a third bitstream ($b_2$).

2 Claims, 4 Drawing Sheets

(52) U.S. Cl.
CPC ....... *H04S 2400/03* (2013.01); *H04S 2400/11* (2013.01)

(56) References Cited

U.S. PATENT DOCUMENTS

| | | | | |
|---|---|---|---|---|
| 9,396,588 | B1 | 7/2016 | Li | |
| 9,648,438 | B1 | 5/2017 | Petrov | |
| 10,419,865 | B2 | 9/2019 | Briand | |
| 10,770,080 | B2 | 9/2020 | Dick | |
| 10,819,953 | B1 * | 10/2020 | Lovitt | G06F 16/487 |
| 10,924,875 | B2 | 2/2021 | Settel | |
| 10,953,327 | B2 | 3/2021 | Fersch | |
| 11,102,604 | B2 | 8/2021 | Eronen | |
| 11,269,586 | B2 | 3/2022 | Tsingos | |
| 11,303,875 | B2 | 4/2022 | Malaika | |
| 11,321,906 | B2 | 5/2022 | Melkote Krishnaprasad | |
| 11,455,705 | B2 | 9/2022 | Banerjee | |
| 2004/0098462 | A1 | 5/2004 | Horvitz | |
| 2008/0144794 | A1 | 6/2008 | Gardner | |
| 2011/0066262 | A1 | 3/2011 | Kelly | |
| 2011/0210982 | A1 | 9/2011 | Sylvan | |
| 2014/0222439 | A1 | 8/2014 | Jung | |
| 2014/0355766 | A1 * | 12/2014 | Morrell | H04S 7/304 381/18 |
| 2014/0355825 | A1 | 12/2014 | Kim | |
| 2015/0012466 | A1 | 1/2015 | Sapiro | |
| 2015/0029218 | A1 | 1/2015 | Williams | |
| 2015/0109415 | A1 | 4/2015 | Son | |
| 2015/0304634 | A1 | 10/2015 | Karvounis | |
| 2015/0350846 | A1 | 12/2015 | Chen | |
| 2016/0361658 | A1 | 12/2016 | Osman | |
| 2017/0018121 | A1 | 1/2017 | Lawson | |
| 2017/0115488 | A1 | 4/2017 | Ambrus | |
| 2017/0295446 | A1 | 10/2017 | Thagadur Shivappa | |
| 2018/0357038 | A1 | 12/2018 | Olivieri | |
| 2019/0215632 | A1 | 7/2019 | Chung | |
| 2019/0295558 | A1 | 9/2019 | Purnhagen et al. | |
| 2020/0162833 | A1 | 5/2020 | Lee | |
| 2020/0236489 | A1 | 7/2020 | Merimaa et al. | |
| 2020/0250466 | A1 | 8/2020 | Lee | |
| 2021/0056978 | A1 | 2/2021 | Mehta | |
| 2021/0120360 | A1 | 4/2021 | Terentiv | |
| 2021/0168553 | A1 | 6/2021 | Brown | |
| 2021/0243546 | A1 | 8/2021 | Audfray | |
| 2021/0258690 | A1 | 8/2021 | Josephus | |
| 2021/0287651 | A1 | 9/2021 | Eronen | |
| 2021/0409886 | A1 | 12/2021 | Schevciw | |
| 2021/0409887 | A1 | 12/2021 | Munoz | |
| 2022/0014868 | A1 | 1/2022 | Binn | |
| 2022/0021996 | A1 | 1/2022 | Brimijoin, II | |
| 2022/0028172 | A1 | 1/2022 | Yip | |
| 2022/0070606 | A1 | 3/2022 | Falk | |
| 2022/0086590 | A1 | 3/2022 | Norris | |
| 2022/0103965 | A1 | 3/2022 | Tu | |
| 2022/0174444 | A1 | 6/2022 | Vilkamo | |
| 2022/0182772 | A1 | 6/2022 | Dodds | |
| 2022/0269471 | A1 | 8/2022 | Tsingos | |
| 2022/0321628 | A1 | 10/2022 | Rhyu | |
| 2023/0065644 | A1 | 3/2023 | Terentiv | |

FOREIGN PATENT DOCUMENTS

| | | | | |
|---|---|---|---|---|
| GB | 2636868 | A * | 7/2025 | H04S 7/30 |
| JP | 2012518313 | A | 8/2012 | |
| JP | 2014513367 | A | 5/2014 | |
| JP | 2015233252 | A | 12/2015 | |
| JP | 2017079457 | A | 4/2017 | |
| RU | 2560340 | C2 | 8/2015 | |
| RU | 2575690 | C2 | 2/2016 | |
| RU | 2605370 | C2 | 12/2016 | |
| WO | 200155833 | W | 8/2001 | |
| WO | 2013064914 | A1 | 5/2013 | |
| WO | WO-2019067445 | A1 * | 4/2019 | H04S 7/304 |
| WO | 2020043539 | A1 | 3/2020 | |
| WO | 2021170900 | A1 | 9/2021 | |
| WO | 2022015020 | A1 | 1/2022 | |
| WO | 2022022876 | A1 | 2/2022 | |
| WO | 2022072242 | A1 | 4/2022 | |
| WO | 2022089713 | A1 | 5/2022 | |
| WO | 2022136725 | A1 | 6/2022 | |
| WO | 2023285732 | A1 | 1/2023 | |
| WO | 2023187208 | A1 | 10/2023 | |
| WO | 2023220024 | A1 | 11/2023 | |
| WO | 2024059505 | A1 | 3/2024 | |
| WO | 2024123936 | A2 | 6/2024 | |
| WO | 2024182457 | A1 | 9/2024 | |
| WO | WO-2024208956 | A1 * | 10/2024 | H04S 7/304 |
| WO | 2025136874 | A1 | 6/2025 | |

OTHER PUBLICATIONS

Breebaart Jet al: “Multi-channel goes mobile: MPEG surround binaural rendering”, AES International Conference. Audio for Mobile and Handhelddevices, XX, XX, Sep. 2, 2006 (Sep. 2, 2006), pp. 1-13. 13 pages.

Chan, K. et al “Distributed Sound Rendering for Interactive Virtual Environments” IEEE International Conference on Multimedia and Expo ,Jun. 27-30, 2004, pp. 1-4.

D22117 to be cross-cited with D22091 and D17029 Both Ways D22040WO01 is to be cited in D22117 only.

Immersive audio, capture, transport, and rendering: a review. Published online by Cambridge University Press: Sep. 16, 2021. Xuejing Sun. 24 pages.

J Breebaart et al: “Binaural Cues for Multiple Sound Sources” In: “Spatial Audio Processing: MPEG Surround and Other Applications”, Jan. 1, 2007 (Jan. 1, 2007), John Wiley & Sons. 16 pages.

Mariette, N. et al “SoundDelta a Study of Audio Augmented Reality using WIFI-distributed Ambisonic Cell Rendering” AES, presented at the 128th Convention, May 22-25, 2010, London, UK, pp. 1-15.

Minnaar Pauli et al: “The importance of head movements for binaural room synthesis—a pilot experiment”, Jan. 1, 2000 (Jan. 1, 2000). 6 pages.

Natural listening over headphones in augmented reality using adaptive filtering techniques. Rishabh Ranjan, Woon-Seng Gan. IEEE/ACM Transactions on Audio, Speech and Language Processing, vol. 23, Issue 11, Nov. 2015 https://dl.acm.org/doi/10.1109/TASLP.2015.2460459. 15 pages.

Personalizing head related transfer functions for earables.Zhijian Yang, Romit Roy Choudhury. SIGCOMM ’21: Proceedings of the 2021 ACM SIGCOMM 2021 Conference, Aug. 2021 https://dl.acm.org/doi/abs/10.1145/3452296.3472907. 14 pages.

Warusfel, O. et al “Listen Augmenting Everyday Environments Through Interactive Soundscapes” Cordis EU Research, start date Jan. 1, 2001.

XR over 5G, 3GPP latest developments around immersive media. Gilles Teniou—(Tencent) 3GPP SA4 Vice-Chair—Video SWG chair VRIF Second VRIF Online Event—Apr. 22, 2021. https://www.vr-if.org/wp-content/uploads/VRIF-April-2021-Workshop-3GPP-SA4-presentation.pdf. 32 pages.

3GPP TS 26.253 V18.3.0 Release 18, ETSI, Jan. 2025, pp. 1-860, 861 pages.

Breebaart, J., van de Par, S., Kohlrausch, A., & de Vries, L. (2005). Parametric coding of stereo audio. EURASIP Journal on Applied Signal Processing, 2005(9), 1309-1316. https://doi.org/10.1155/ASP.2005.1305. 20 pages.

Herre, J., Plogsties, J., Disch, S., & Breebaart, J. (Oct. 2004). Spatial audio coding: Next-generation efficient and compatible coding of multi-channel audio (AES Convention Paper No. 6186). Audio Engineering Society 117th Convention. https://www.aes.org/e-lib/browse.cfm?elib=13126. pp. 1-6. 13 pages.

Chan, K. et al “Distributed Sound Rendering for Interactive Virtual Environments” IEEE International Conference on Multimedia and Expo , Jun. 27-30, 2004, pp. 1-4. 4 pages.

Mariette, N. et al “SoundDelta a Study of Audio Augmented Reality using WIFI-distributed Ambisonic Cell Rendering” AES, presented

(56) References Cited

OTHER PUBLICATIONS at the 128th Convention, May 22-25, 2010, London, UK, pp. 1-15. 15 pages.

* cited by examiner

BINARUAL RENDERING

CROSS-REFERENCE TO RELATED APPLICATIONS

This application claims priority to U.S. Provisional Application 63/386,465 filed on Dec. 7, 2022, the contents of which are herein incorporated by reference in their entirety.

TECHNICAL FIELD OF THE INVENTION

The present invention relates generally to audio processing.

BACKGROUND

Immersive audio is an essential media component of extended reality (XR) applications, which includes augmented reality (AR), mixed reality (MR) and virtual reality (VR). To enhance the user experience, immersive audio may support adjusting the presented immersive audio/visual scene in response to motion of the user. For example, it may be desirable to track a user's head position and head movement during audio rendering and to adjust the audio accordingly. Thus, an immersive audio experience may process head movements using models with three degrees of freedom (3DoF) or six degrees of freedom (6DoF).

Various immersive audio services, e.g., immersive voice and audio services (IVAS), may be used to render high quality audio renditions at the XR device that include awareness of pose information, which may include metadata for head positions with relative or absolute movements of the user. However, making such adjustments according to pose information may require significant computational processing capabilities to achieve a high-quality immersive audio experience.

The computational complexity requirements for immersive audio may be problematic for small form factor devices such as AR glasses. To make them as practical and user-friendly as possible, such AR glasses may avoid using powerful processors and heavy batteries, which may otherwise result in bulky, more expensive, and heavy weight user-worn devices that consume more power and generate a significant amount of heat. Consequently, to enable reasonable form factor low power operation with low latency, such AR devices tend to have processors with reduced complexity and constrained numerical operations.

The present disclosure recognizes the above noted problems and explores potential solutions. One potential solution is to reduce audio rendering requirements at the end-device (e.g., the AR device operated by the user) with a split-rendering topology that leverages processing from some other entity of the mobile/wireless network (e.g., a network based device) to which the end-device is connected or tethered (e.g., via a network or cloud-based connection). For example, a powerful network entity such as mobile user equipment (e.g., UE, a device used by an end-user, a portable multi-function device, a gaming console, a cloud-based resource, etc.) may be connected to the end-device to assist in split-rendering of immersive audio. Pose information based on the user movement may be gathered at the end-device and transmitted to the network entity. The end-device may then only receive the already rendered audio from the network entity; where the high complexity calculations such as processing 3DoF/6DoF pose information (e.g., head-tracking metadata) may be performed by the rendering entity (e.g., network entity). One problem with the described split-rendering topology is the latency for transmissions between end-device and network entity may be on the order of 100 ms; which means the network entity may be relying on outdated pose/head-tracking information. Because of this delay, the rendered audio from the network entity may not match the current head pose/head position of the user at the end-device. If the motion-to-sound latency is too large, the end user will experience a perceivable loss of quality in the immersive experience.

Document U.S. 63/340,181 discloses a novel approach to interactive headtracking. The described approach generates multiple binaural representations corresponding to various head poses at the main device or pre-renderer and computes metadata which can be used along with a reference binaural signal to reconstruct binaural output corresponding to any given pose at the post-renderer. The reference binaural signal and the metadata are sent to a post-rendering device. Based on the received binaural signal and metadata, and on a difference between a reference pose and a detected current head pose of the user, the post-renderer determines binaural audio corresponding to the current head pose. The present disclosure appreciates that the metadata requirements for head-pose information required in this type of solution may be significant. For example, if the current head pose deviates significantly from the reference head-pose, a large amount of metadata would be sent to the post-rendering device to cover all possible head poses.

It is with respect to these and other considerations that the disclosure made herein is presented.

SUMMARY

Enclosed are techniques for split-rendering of immersive audio.

It is an object of the present invention to overcome this problem, and to enable efficient split rendering also in a situation where the head pose of the user is expected to change considerably.

In some embodiments, a method of processing audio in a main device is described, the method comprising receiving a first bitstream, decoding the first bitstream to obtain decoded immersive audio content, receiving a second bitstream, decoding the second bitstream to obtain pose information relating to a user of a lightweight processing device, determining a first head-pose, based on the pose information, rendering a downmix representation of the immersive audio content corresponding to the first head pose, selecting a second set of head poses with respect to the first head pose, rendering a set of binaural representations of the immersive audio content, the binaural representations corresponding to the second set of poses, computing reconstruction metadata enabling reconstruction of the set of binaural representations from the downmix representation, the metadata including the first head pose, encoding the downmix representation and the reconstruction metadata in a third bitstream, and outputting the third bitstream.

In some additional embodiments, a method of processing audio in a lightweight processing device is described, the method comprising receiving a bitstream from a main device, decoding the bitstream to obtain a downmix representation of an immersive audio content associated with a first head pose, and first reconstruction metadata, enabling reconstruction of a set of binaural representations from the downmix presentation, the set of binaural representations being associated with a set of second head poses, the reconstruction metadata including the first head pose, and obtaining the set of second head poses with which the first reconstruction metadata is associated. The method further comprises detecting a current head pose of a user of the lightweight processing device, transmitting the current head pose to the main device, and computing output binaural audio based on the downmixed presentation, the first reconstruction metadata, the set of second head poses, and a relationship between the first head pose and the current head pose.

In still some embodiments, the downmix representation is a first binaural representation. In other embodiments, the downmix representation includes a mono signal formed by a combination of channels in a multichannel representation of the immersive audio content.

A "lightweight processing device" is intended to include any user device that has limited capabilities, and therefore may be unsuitable for binaural rendering in real time. In some examples, a "lightweight processing device" refers to the physical weight of the device. In other examples, a "lightweight processing device" refers to the processing capabilities of the device. A typical example lightweight device may have limited battery capacity and limited processing capabilities so that the physical device may be maintained in a small form factor.

Existing techniques for head-tracked split rendering require more processing resources than necessary, wasting device energy and requiring costly physical components (e.g., powerful processors requiring large heatsinks or active cooling components) which often result in heavy and cumbersome device. These considerations are particularly important in battery operated devices and wearable devices.

Accordingly, the herein disclosed techniques provide electronic devices with faster, more efficient methods for head-tracked split rendering. Such methods optionally complement or replace other methods for head-tracked split rendering. For battery-operated and wearable computing devices, such methods conserve power, increase the time between battery charges, and enable construction of more comfortable devices at reduced cost.

In accordance with some embodiments, a method performed at one or more electronic devices is described. The method comprises: receiving, by a first, main processing device, an immersive audio, obtaining (current) user pose information; determining, by the first device, from the immersive audio, a downmixed signal including at least one channel; determining, by the first device, a set of N (e.g., N≥1) predicted poses based the obtained user pose information; determining, by the first device, from the immersive audio, a set of binaural representations corresponding to the set of N predicted poses; generating, by the first device, from the downmix signal and from at least one of the set of binaural representations and a metadata model, a metadata; and providing, by the first device to a second, lightweight processing device different from the first device. In accordance with some embodiments, obtaining user pose information is performed at least in part by a second device, and includes providing (e.g., transmitting) data corresponding to the obtained user pose information from the second device to the first device.

In accordance some embodiments, the method includes rendering, by a renderer of the second device, the downmixed signal into output binaural audio based at least in part on the metadata, the obtained user pose information, and updated user pose information. In accordance some embodiments, the downmix signal is a binaural signal generated using: a set of HRTFs or a set of BRIRs; and the obtained user pose information. In accordance some embodiments, determining a set of predicted poses includes calculating N poses corresponding to N predicted angles along yaw axis, herein referred to as yaw angles, by: modifying a head pose yaw angle derived from the obtained user pose information by a first pre-determined value (e.g., angle specified in degrees or radians) in first direction to obtain a first predicted yaw angle of the N predicted yaw angles. In accordance some embodiments, the method includes modifying the pose yaw angle derived from the obtained user pose information by second pre-determined value in a second direction (e.g., anti-clockwise, clockwise) to obtain a second predicted yaw angle of N predicted yaw angles.

In accordance with some embodiments, a non-transitory computer-readable storage medium is described. The non-transitory computer-readable storage medium stores one or more computer programs configured to be executed by one or more processors of a computing apparatus, the one or more computer programs including instructions for: receiving, by a first device, an immersive audio, obtaining user pose information; determining, by the first device, from the immersive audio, a downmixed signal including at least one channel; determining, by the first device, a set of N (e.g., N≥1) predicted poses based on the obtained user pose information; determining, by the first device, from the immersive audio, a set of binaural representations corresponding to the set of N predicted poses; generating, by the first device, from the downmix signal and from at least one of the set of binaural representations and a metadata model, a metadata; and providing, by the first device to a second device different from the first device. In accordance with some embodiments, obtaining user pose information is performed at least in part by a second device, and includes providing (e.g., transmitting) data corresponding to the obtained user pose information from the second device to the first device.

In accordance some embodiments, the one or more computer programs includes instructions for rendering, by a renderer of the second device, the downmixed signal into output binaural audio based at least in part on the metadata, the obtained user pose information, and updated user pose information. In accordance some embodiments, the downmix signal is a binaural signal generated using: a set of HRTFs or a set of BRIRs; and the obtained user pose information. In accordance some embodiments, the one or more computer programs includes instructions for determining a set of predicted poses includes calculating N poses corresponding to N predicted yaw angles by: modifying a pose yaw angle derived from the obtained user pose information by a first pre-determined value (e.g., angle specified in degrees or radians) in first direction to obtain a first predicted yaw angle of the N predicted yaw angles. In accordance some embodiments, the one or more computer programs includes instructions for modifying the pose yaw angle derived from the obtained user pose information by second pre-determined value in a second direction (e.g., anti-clockwise, clockwise) to obtain a second predicted yaw angle of N predicted yaw angles.

In accordance with some embodiments, an apparatus is described. The apparatus one or more processors; and memory storing one or more programs configured to be executed by the one or more processors, the one or more programs including instructions for: receiving, by a first device, an immersive audio, obtaining user pose information; determining, by the first device, from the immersive audio, a downmixed signal including at least one channel; determining, by the first device, a set of N (e.g., N≥1) predicted poses based the obtained user pose information; determining, by the first device, from the immersive audio, a set of binaural representations corresponding to the set of N predicted poses; generating, by the first device, from the downmix signal and from at least one of the set of binaural representations and a metadata model, a metadata; and providing, by the first device to a second device different from the first device. In accordance with some embodiments, obtaining user pose information is performed at least in part by a second device, and includes providing (e.g., transmitting) data corresponding to the obtained user pose information from the second device to the first device.

In accordance some embodiments, the one or more computer programs includes instructions for rendering, by a renderer of the second device, the downmixed signal into output binaural audio based at least in part on the metadata, the obtained user pose information, and updated user pose information. In accordance some embodiments, the downmix signal is a binaural signal generated using: a set of HRTFs or a set of BRIRs; and the obtained user pose information. In accordance some embodiments, the one or more computer programs includes instructions for determining a set of predicted poses includes calculating N poses corresponding to N predicted yaw angles by: modifying a pose yaw angle derived from the obtained user pose information by a first pre-determined value (e.g., angle specified in degrees or radians) in first direction to obtain a first predicted yaw angle of the N predicted yaw angles. In accordance some embodiments, the one or more computer programs includes instructions for modifying the pose yaw angle derived from the obtained user pose information by second pre-determined value in a second direction (e.g., anti-clockwise, clockwise) to obtain a second predicted yaw angle of N predicted yaw angles.

The embodiments described herein may be generally described as techniques, where the term "technique" may refer to system(s), device(s), method(s), computer-readable instruction(s), module(s), component(s), hardware logic, and/or operation(s) as suggested by the context as applied herein.

Features and technical benefits other than those explicitly described above will be apparent from a reading of the following Detailed Description and a review of the associate drawings. This Summary is provided to introduce a selection of techniques in a simplified form, and not intended to identify key or essential features of the claimed subject matter, which are defined by the appended claims.

BRIEF DESCRIPTION OF THE DRAWINGS

The present invention will be described in more detail with reference to the appended drawings.

DETAILED DESCRIPTION OF CURRENTLY PREFERRED EMBODIMENTS

Figure 1:
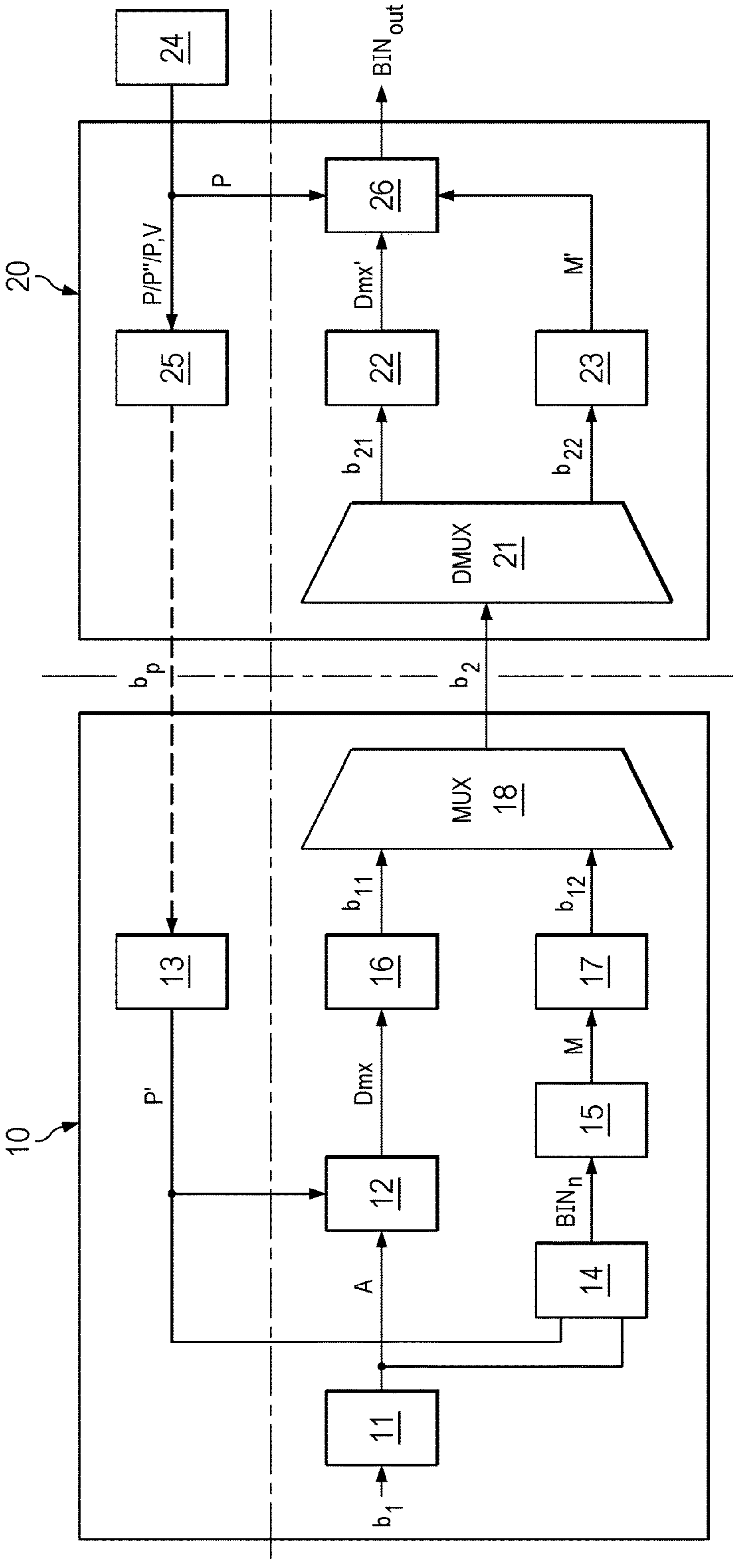
FIG. 1 is a block diagram showing an example of low complexity low bitrate prediction-based split rendering using a downmix signal, in accordance with embodiments of the invention.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Embodiments of the invention disclosed herein assume compatibility and consistency with usage of an immersive audio codec such as IVAS in an XR application. In particular, the inventive concepts described in detail below are applicable to systems, devices, architectures, methods, and techniques where main decoding and pre-rendering are performed by a main device (UE) with high resources such a powerful computational processing (or processor) resources with significant power or battery capabilities (e.g., an edge or other network node/server of an 5G system, a high performance mobile device, etc.) and final decoding and post-rendering are performed by a different device with lower resources relative to the main device (e.g., a lightweight device, a wearable device, AR glasses, head-mounted display, heads-up-display, etc.).

Embodiments of the proposed techniques, systems, devices, methods, and computer-readable instructions for low complexity low bitrate prediction-based split rendering, which may include operations such as:

1. Receiving a pose P' (first head pose) information from a post-renderer (lightweight processing device) to a pre-renderer (main device).
2. Generating at the pre-renderer, a one or two channel downmix signal from received immersive audio. The downmix signal can be a binaural signal rendered using a set of HRTFs (or BRIRs) and pose P' OR the downmix signal can be a combination of prototype signal and zero or more diffused signals.
3. Determining at the pre-renderer, a set of N second poses $P_n$ that are close to first pose P', wherein $N \geq 1$ and $1 \leq n \leq N$.
4. Generating at the pre-renderer, N binaural representations using the $P_1$ to $P_N$ poses and set of HRTFs (or BRIRs).
5. Optimizing the multi-binauralization process by re-using the HRTF-filtered channels that do not change between poses $P_n$.
6. Computing prediction gains to predict correlated components in N binaural representations with respect to one or more downmix signals.
7. Computing diffuseness gain parameters to fill in the uncorrelated energy.
8. Computing model parameters of a model approximating the evolution of metadata (prediction and diffuseness gains) as a function of a current (actual) head pose.

9. Coding the first head pose P', downmix signals and metadata (prediction and diffuseness gains or model parameters) and sending the multiplexed bitstream to post-renderer device.
10. Decoding at the post renderer, the first head pose P', downmix signals and metadata (prediction and diffuseness gains or model parameters).
11. Adjusting at the post renderer, prediction and diffuseness gains based on the difference between the current head pose P and the first head pose P' and the received metadata and (optionally) the model.
12. Reconstructing at the post renderer, the binaural output corresponding to current head pose P by applying the adjusted metadata coefficients to decoded downmixed signals.

Note, one or more aspects of the proposed techniques, systems, devices, methods and computer-readable instructions described herein, including those listed above, do not require the particular order shown, or sequential order, to achieve desirable results. In addition, other steps may be provided, or steps may be eliminated, from the descriptions herein, and other components may be added to, or removed from, the described systems. Accordingly, other embodiments are within the scope of the claims following the main description.

FIG. 1 is a block diagram of an example system for low-complexity low bitrate prediction based split rendering using a downmix signal, arranged in accordance with some embodiments. As illustrated, the example system may include a first device 10 (or a main processing device) and a second device 20 (or lightweight processing device).

The first device 10 (or main processing device, or pre-renderer) includes a decoder 11, a downmixer 12, a head pose decoder 13, a binaural renderer 14, a metadata generator 15, a first encoder 16, a second encoder 17, and a multiplexer 18. The decoder 11, e.g., an IVAS decoder, is configured to receive and decode a bitstream $b_1$, and decode an immersive audio content A. The downmixer 12 is configured to receive the immersive audio content and provide a downmix representation, Dmx, of the audio content. The head pose decoder 13 is configured to receive and decode a bitstream $b_p$, which includes head pose information, and generates a first head pose P'. The binaural renderer 14 is configured to receive the first head pose P' and the immersive audio content A and responsively render one or several binaural representations corresponding to the first head pose P'. The metadata generator 15 is configured to receive the downmix Dmx and binaural representations, and responsively generate reconstruction metadata M allowing reconstruction of the binaural representations from the downmix. The metadata M includes the first pose P'. The first encoder 16 is configured to receive downmix Dmx, and responsively encode the downmix Dmx as encoded bitstream bu. The second encoder 17 is configured to receive reconstruction metadata M (including the first pose P'), and responsively encode the reconstruction metadata as encoded bitstream $b_{12}$. The multiplexer 18 is configured to receive the encoded bitstreams $b_{11}$ and $b_{12}$ from the outputs of the two encoders, and responsively combine the encoded bits into a bitstream $b_2$. The main device may also include an interface to output the bitstream $b_2$, whereby the bitstream may be subsequently transmitted or otherwise made available to another device that is external to the main device 10.

The second device 20 (lightweight processing device or post-renderer device) includes a demultiplexer 21, a first decoder 22, a second decoder 23, a head-tracker 24, a pose information encoder 25, and a binaural reconstruction block 26. the second or lightweight processing device 20 may be a user-held device. The demultiplexer 21 is configured to receive bitstream $b_2$ and responsively separate the received bitstream $b_2$ into two encoded bitstreams $b_{21}$ and $b_{22}$. The decoder 22 is configured to receive encoded bitstream $b_{21}$, and responsively decode bitstream $b_{21}$ into a downmix signal Dmx'. The decoder 23 is configured to receive encoded bitstream $b_{22}$, and responsively decode bitstream $b_{22}$ into metadata M', including the first pose P'. The head tracker 24 is configured to sense a user head position, and responsively generate pose information, e.g., including a current (actual) user head pose P. The pose information encoder 25 is configured to receive the pose information from the head-tracker 24, and responsively encode the pose information in a bitstream $b_P$. The binaural reconstruction block 26 is configured to receive the current user head pose P, the downmix signal Dmx', and metadata M', including the first pose P', and responsively determine a binaural output based on the downmix Dmx', the metadata M', and the current head pose P in relation to the first head pose P'.

In FIG. 1, the light weight/post-renderer device 20 (depicted as right-side block of FIG. 1) receives and encodes a pose P (e.g., data representing the pose of user/wearer of the light weight device is encoded into a representation suitable for transmission), and sends pose P (e.g., as coded data, as bitstream $b_p$) to the main/pre-renderer device 10 (depicted as left-side block of FIG. 1) through a data channel (e.g., a back channel). The main/pre-renderer device 10 receives and decodes (e.g., at the decoder 13) the received pose data $b_p$, obtaining P', which may be a delayed and quantized version of pose P.

In some example implementations, the pose information received by light weight/post-renderer device 20 (depicted as right side block of FIG. 1) includes not only pose P but also one or more parameters V associated with head motion (e.g., rotation including angular velocity, acceleration or deceleration of user's head rotation, etc.). The pose information encoder 25 then performs a pose prediction of $n^{th}$ order (e.g., using motion data and/or pose data associated with a pose at a first time to predict a pose associated with a different time, e.g., a second time, which may be either a later time or an earlier time relative to the first time) to generate a predicted pose P", and encodes and sends pose P" (e.g., as coded data in bitstream $b_p$) to the main/pre-renderer device 10 (depicted as left-side block of FIG. 1) through a data channel (e.g., a back channel). The main/pre-renderer device decodes the received pose data $b_p$ (e.g., at decoder 13), obtaining the first head pose P', which may be a delayed and quantized version of the predicted pose P".

In some example implementations, the pose information received by light weight/post-renderer device 20 (depicted as right-side block of FIG. 1) includes not only pose P but also one or more parameters V associated with head motion (e.g., rotation including angular velocity, acceleration or deceleration of user's head rotation, etc.). The pose information encoder 25 then encodes pose P and parameters V (e.g., data representing the pose and motion of user/wearer of the light weight device is encoded into a representation suitable for transmission), and transmits the encoded data (e.g, bitstream $b_p$) to the main/pre-renderer device 10 (depicted as left-side block of FIG. 1) through a data channel (e.g., a back channel). Main/pre-renderer device decodes (e.g., at decoder 13) the received pose and motion data via $b_p$, which may be a delayed and quantized version of pose P and parameters V respectively. In this case, the main device 10 then applies a pose prediction of $n^{th}$ order based on the received pose and motion data and generates the first head pose P' (e.g., using motion data and/or pose data associated with a pose at a first time to predict a pose associated with a different time, e.g., second time, which may be either a later time or an earlier time relative to the first time).

In some example implementations, a light weight/post-renderer device 20 (depicted as right-side block of FIG. 1) receives pose P (e.g., data representing the pose of user/wearer of the light-weight device 20) and does not send that pose to the main/pre-renderer device 10 (depicted as left-side block of FIG. 1). In such embodiments, the main/pre-renderer device then blindly assumes a first head pose P' based on defaults applicable for the operations of that device. This case may apply in cases where no back channel exists such as in one-to-many distribution scenarios such as a broadcast to multiple devices (e.g., multiple light weight/post renderer devices).

As depicted in FIG. 1, the main device/pre-render 10 receives immersive audio signal that includes audio content A (e.g., output of an immersive decoder 11 such as IVAS, a QMF signal, etc.). Audio content A is converted into downmix signal Dmx (e.g., by downmixer 12) using the first head pose P'. In some embodiments, Dmx may comprise one channel, while in some other embodiments, Dmx may comprise more than one channel (e.g., at least two channels).

Renderer 14 generates one or more binaural representations $BIN_n$ from audio content A, the one or more binaural representations corresponding to one or more poses $P_n$ that are estimated from pose P', where $1 \le n \le N$ and $N \ge 1$. The one or more poses (set of second head poses) may be determined based on a set of predefined offsets with respect to the first head pose P'. A metadata generator (e.g., generator 15) generates metadata M based on the Dmx signal and binaural signals BINn such that any of BINn binaural signals can be reconstructed using Dmx signal and metadata M. The downmix representation Dmx is coded by encoder 16 which generates a bitstream $b_{11}$, Metadata M is quantized and coded (e.g., by encoder 17), generating a bitstream $b_{12}$. Bitstreams $b_{11}$ and $b_{12}$ are combined into bitstream $b_2$ by multiplexer 18.

In some embodiments, the downmix representation includes two signals. In this case, the metadata should allow a reconstruction from two signals (the downmix) to two signals (the binaural output). A two-by-two matrix is an efficient way to enable such a reconstruction. In some embodiments, the metadata M includes a two-by-two matrix for each time unit and for each frequency band, i.e., for each time-frequency tile.

As depicted in FIG. 1, at the lightweight device/post-renderer 20, $b_2$ is received and separated into $b_{21}$ and $b_{22}$ bitstreams by demultiplexer 21. Bitstream $b_{21}$ is fed to a decoder (e.g., decoder 22) which reconstructs the downmix signal Dmx and generates a reconstructed downmix representation Dmx'. Bitstream $b_{22}$ is fed to a MD decoding and dequantizing (un-quant) block (e.g., decoder 23) which reconstructs the metadata M and generates a reconstructed metadata M'. As noted above, this metadata M' includes also the first pose P'. The downmix representation Dmx' and metadata M' are then fed to the binaural reconstruction block 26 which generates head tracked binaural output using Dmx' and metadata M', the set of second head poses, and a relationship between the current head pose P and the first pose P'.

In order to allow binaural reconstruction, the lightweight device obtains information about the set of second head poses to which the reconstruction metadata relates. In embodiments where the set of second head poses $P_n$ is determined by applying a set of offsets to the first head pose, then these offsets may be known beforehand (and e.g., be applied by the reconstruction block 26). Alternatively, these offsets may be included in the metadata M received in the bitstream $b_2$.

The reconstruction may involve first computing modified reconstruction metadata from the current head pose P and metadata M' (e.g. by interpolation), and then applying this modified metadata to the downmix signal Dmx'.

In an example implementation with N=2, the downmixer 12 is a binaural renderer that generates the Dmx signal as a first (reference) binaural signal $BIN_{ref}$ using a set of HRTFs (or BRIRs) and the first head pose P'. Poses $P_n$ are P'+X, P'−X' where X and X' are the assumed deviations in yaw angle between P' and P. Renderer 14 generates two binaural outputs $BIN_n$ corresponding to P'+X and P'−X' poses. The reference binaural signal $BIN_{ref}$ and binaural signals $BIN_n$ corresponding to Poses $P_n$ are then fed into metadata generator block 15 that generates metadata M corresponding to P'+X and P'−X' poses. The metadata M is quantized and coded by MD quant and coding block 17. The $BIN_{ref}$ signal is coded by encoder 16. The multiplexed bitstream $b_2$ is sent to the post-renderer device 20 which decodes $BIN_{ref}$ signal and M metadata and feeds it to the binaural reconstruction block 26. Reconstruction block 26 interpolates or extrapolates the metadata based on the difference between P', P'+X and P'−X' and the current head pose P. The interpolation may be linear or triangular or based on sin or cosine-based models, etc. Reconstruction block 26 applies interpolated metadata to $BIN_{ref}$ as proposed in U.S. Provisional Application 63/340,181 (hereby incorporated by reference) and generates the head-tracked binaural signal $BIN_{out}$. In an example implementation, the usage of decorrelators is avoided by directly using decorrelator coefficients with the sum of Left and Right channels of $BIN_{ref}$ as mentioned below:

$$\begin{bmatrix} z_{l,p}[n] \\ z_{r,p}[n] \end{bmatrix} = M_p \begin{bmatrix} y_{l,p_o}[n] \\ y_{r,p_o}[n] \end{bmatrix} + \begin{bmatrix} |g_{p,p}| \\ g_{p,p} \end{bmatrix} (y_{l,p_o}[n] + y_{r,p_o}[n])$$

Here, $z_{l,p}$ [n] and $z_{r,p}$ [n] are the $n^{th}$ samples of Left and Right channels of the reconstructed BIN signal as per current head pose P. $M_p$ is the (two-by-two) prediction coefficients mixing matrix, $y_{l,p_o}$ [n] and $y_{r,p_o}$ [n] are the $n^{th}$ samples of Left and Right channels of $BIN_{ref}$ signal, $g_{p,p}$ is the decorrelation coefficient. Computation of $M_p$ and $g_{p,p}$ is same as given in U.S. Provisional Application 63/340,181.

In some embodiments, downmixer 12 generates a combination of a mono channel (prototype signal) and zero or more diffused channels (diffused signal(s)) as Dmx signals. The mono signal, S, may be formed as a combination of channels of a multichannel representation of the immersive audio content A, e.g. combination of the signals of a first binaural representation. The diffused signal, D, may be formed as a combination of diffused components of the same multichannel representation of the immersive audio content A.

In some embodiments, such operations may be applied in time, CQMF, subband or frequency domain and all coefficients subject to or resulting from such operations may be complex. In some embodiments, the prototype signal is generated from $BIN_{ref}$ signal as follows S=aL+bR, and the diffused signal is generated as D=cL+dR, wherein L and R are left and right channels of $BIN_{ref}$ signal, a and b are gain parameters that are either dynamically computed or statically determined for e.g., a=0.5, b=0.5. c and d are dynamically computed using covariance of L and R channels of the $BIN_{ref}$ signal. S is the prototype signal and D is the diffused signal. In an embodiment, a, b, c and d are computed as follows:

Let the $BIN_{ref}$ covariance be $$Bref_{cov_{[2x2]}} = \begin{pmatrix} l & q\hat{u}1^* \\ q\hat{u}1 & r \end{pmatrix},$$

where $\widehat{u1}$ is a unit vector and q is the absolute value of covariance of L and R channels. Assuming a mid-side conversion from L, R as:

$$M = norm*(L+R)$$

$$S = norm*(L-R)$$

covariance of MS channels can be easily computed from covariance of L and R channels as:

$$MSref_{cov_{[2x2]}} = \begin{pmatrix} m & a\hat{u}^* \\ a\hat{u} & s \end{pmatrix},$$

where û is a unit vector of length 1 and α is the absolute value of covariance of M and S channels.

It can be shown that an optimal solution to obtain prototype signal and diffused signal leads to the value of a, b, c and d as follows:

$$a=\text{norm}*(1+\hat{u}f)$$

$$b=\text{norm}*(1-\hat{u}f)$$

$$c=\text{norm}*(1-g\hat{u}-gf)$$

$$d=\text{norm}*(gf-g\hat{u}-1)$$

wherein $$f=\alpha/\max(m,s)$$

$$g=(\alpha+sf)/(sf^2+2\alpha f+m)$$

Renderer 12 generates two binaural outputs $BIN_n$ corresponding to P'+X and P'−X' poses. The protype signal S and diffused signal D and $BIN_n$ signals are then fed into metadata generator block 15 that generates metadata M corresponding to P'+X and P'−X' signals. If $L_x$ and $R_x$ are left and right signal corresponding to P'+X then metadata corresponding to P'+X signals can be computed as follows:

$$Pred_L = \frac{\text{Cov}_{SL}}{\text{Cov}_{SS}}$$

$$Pred_R = \frac{\text{Cov}_{SR}}{\text{Cov}_{SS}}$$

$$Res_{RR} = \text{Cov}_{RR} - Pred_R^2 * \text{Cov}_{SS}$$

$$Res_{LL} = \text{Cov}_{LL} - Pred_L^2 * \text{Cov}_{SS}$$

$$Diff_L = sqrt\left(\frac{\max(0, \text{real}(Res_{LL}))}{\text{Cov}_{DD}}\right)$$

-continued $$Diff_R = sqrt\left(\frac{\max(0, \text{real}(Res_{RR}))}{\text{Cov}_{DD}}\right)$$

From this metadata and downmix signals S and D, P'+X channels can be reconstructed by reconstruction block 26 as follows:

$$L_x=S*\text{Pred}_L+\text{Diff}_L*D$$

$$R_x=S*\text{Pred}_R+\text{Diff}_R*D$$

Similarly, metadata for P'−X can be computed, and P'−X binaural signals can be reconstructed from metadata and prototype signal S and diffused signal D.

In some implementations, it may be desired to code only one channel due to bitrate limitation. In that case, only the prototype signal is coded and metadata is generated as follows:

$$Pred_L = \frac{\text{Cov}_{SL}}{\text{Cov}_{SS}}$$

$$Pred_R = \frac{\text{Cov}_{SR}}{\text{Cov}_{SS}}$$

$$Res_{RR} = \text{Cov}_{RR} - Pred_R^2 * \text{Cov}_{SS}$$

$$Res_{LL} = \text{Cov}_{LL} - Pred_L^2 * \text{Cov}_{SS}$$

$$Diff_L = sqrt\left(\frac{\max(0, \text{real}(Res_{LL}))}{\text{Cov}_{ss}}\right)$$

$$Diff_R = sqrt\left(\frac{\max(0, \text{real}(Res_{RR}))}{\text{Cov}_{ss}}\right)$$

From this metadata and prototype signal, P'+X channels can be reconstructed by the reconstruction block 26 as follows:

$$L_x=S*\text{Pred}_L+\text{Diff}_L*\text{Decorr}(S)$$

$$R_x=S*\text{Pred}_R+\text{Diff}_R*\text{Decorr}(S)$$

wherein Decorr(S) is the decorrelated version of prototype signal S. Similarly, metadata for P'−X can be computed, and P'−X binaural signals can be reconstructed from metadata and prototype signal.

In some embodiments, the first head pose P' may be transmitted to the lightweight processing device 20 for better synchronization of pose (e.g., as metadata). In case the current head pose P differs from P', P'+X and P'−X', reconstruction block 26 interpolates or extrapolates the metadata based on the difference between P', P'+X and P'−X' and the current head pose P. The interpolation may be, for example, linear or triangular or based on sine or cosine-based models, etc. Reconstruction block 26 applies interpolated metadata to $BIN_{ref}$ as proposed above and generates the head-tracked binaural signal $BIN_{out}$.

In some embodiments, X is equal to X' and poses $P_n$ are P'+X, P'−X wherein X is the assumed deviations in yaw angle between P' and P. In other example implementations, X is not equal to X' and X' may be smaller or greater than X based on, for example, angular velocity and acceleration or deceleration of user's head rotation.

Figure 2:
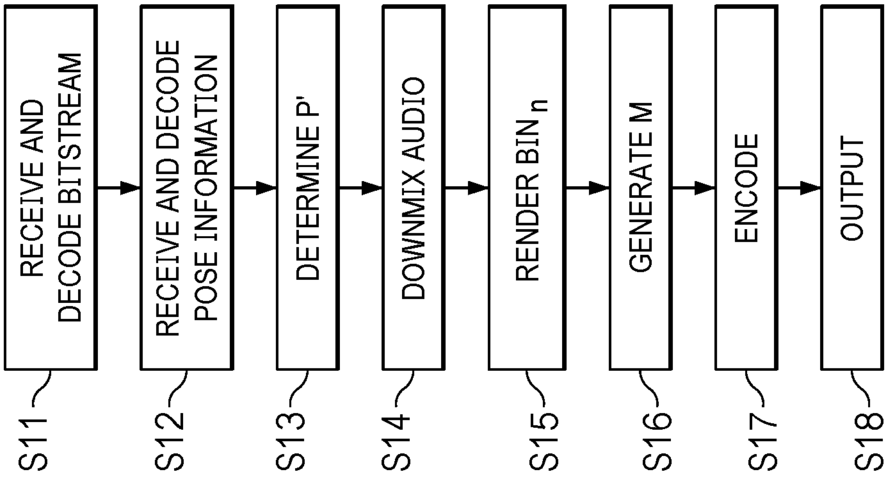
FIG. 2 is a flow chart illustrating processing in a main processing device, in accordance with embodiments of the invention.

FIG. 2 is a flow chart illustrating processing in a main device 10 (or first device), in accordance with embodiments of the invention. The flow chart may be broken into various blocks or partitions, such as blocks S11-S18. Processing for the various blocks of FIG. 2, which may be described as operations, processes, methods, steps, acts or functions, may commence at block S11.

At step S11 (receive & decode bitstream, or receiving and decoding a first bitstream), a first bitstream is received and decoded (e.g., by a decoder 11) to obtain decoded immersive audio content A. At step S12, (receive & decode pose information, or receiving and decoding pose information), a second bitstream may be received and decoded (e.g., by a decoder 13) to obtain pose information associated with a user of a lightweight processing device (e.g., 20). At step S13 (determine P', or determining P'), a first head-pose, P', may be determined (e.g., by head pose decoder 13) based on the pose information. At step S14 (downmix audio, or downmixing audio), a first downmix of the immersive audio content A may be determined (e.g., by a downmixer 12), where the first downmix is a representation of the immersive audio content corresponding to the first head pose. At step S15 (render $BIN_n$, or rendering $BIN_n$), a set of binaural representations of the immersive audio content is rendered (e.g., by renderer 14), where the set of binaural representations correspond to a second set of poses. At step S16 (generate M, or generating M), reconstruction metadata is generated (or computed, e.g., by generator 15), where the reconstruction metadata enables reconstruction of the set of binaural representations from the first downmix representation. At step S17 (encode or encoding), the downmix representation is encoded (e.g., by encoder 16) and the reconstruction metadata, including the first head pose P', is encoded (e.g., by encoder 17). At step S18 (output or outputting), a bitstream $b_2$ is output that includes the first downmix representation Dmx and the reconstruction metadata M. The output step may include transmitting the bitstream $b_2$ to the lightweight processing device from which the pose information was received (e.g., lightweight processing device 20).

Figure 3:
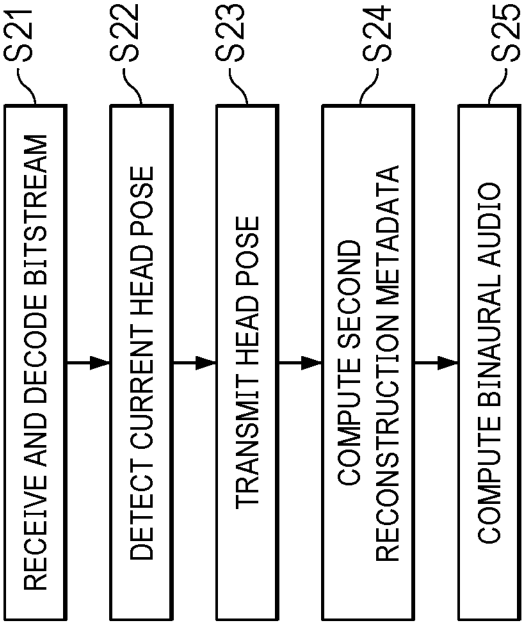
FIG. 3 is a flow chart illustrating processing in a lightweight processing device, in accordance with embodiments of the invention.

FIG. 3 is a flow chart illustrating processing in a lightweight device 20 (or a second or user-held device), in accordance with embodiments of the invention. The flow chart may be broken into various blocks or partitions, such as blocks S21-S25. Processing for the various blocks of FIG. 3, which may be described as operations, processes, methods, steps, acts or functions, may commence at block S21.

The process includes, at step S21 (receive and decode bitstream), receiving and decoding a bitstream $b_2$ from a main device 10 (e.g., by decoders 22, 23) to obtain a downmix representation Dmx of an immersive audio content A, a first head pose, P', and first reconstruction metadata M' enabling reconstruction of a set of binaural representations BINn from the downmix presentation Dmx. Step 21 may optionally be preceded by a demultiplexing step, to divide (e.g., by demultiplexer 21) the bitstream into two or more bitstreams $b_{21}$, $b_{22}$. Step 22 (detect current head-pose) involves detecting (e.g., by head tracker 24) a current head pose P of a user of the lightweight processing device 20. Step S23 (transmit head pose) involves transmitting (e.g., by head pose encoder 25) the current head pose P to the main device 10. Finally, step S25 (compute binaural audio), involves computing (e.g., by reconstruction block 26) output binaural audio BINout based on the downmixed presentation Dmx, the first reconstruction metadata M', and a relationship between the first head pose P' and the current head pose P. Optionally, step S25 is preceded by a step S24 (compute second reconstruction metadata) involving computing second reconstruction metadata based on the first reconstruction metadata, the first head pose and the current head pose. In this case, step S25 may use this second reconstruction metadata to obtain the binaural output.

Figure 4:
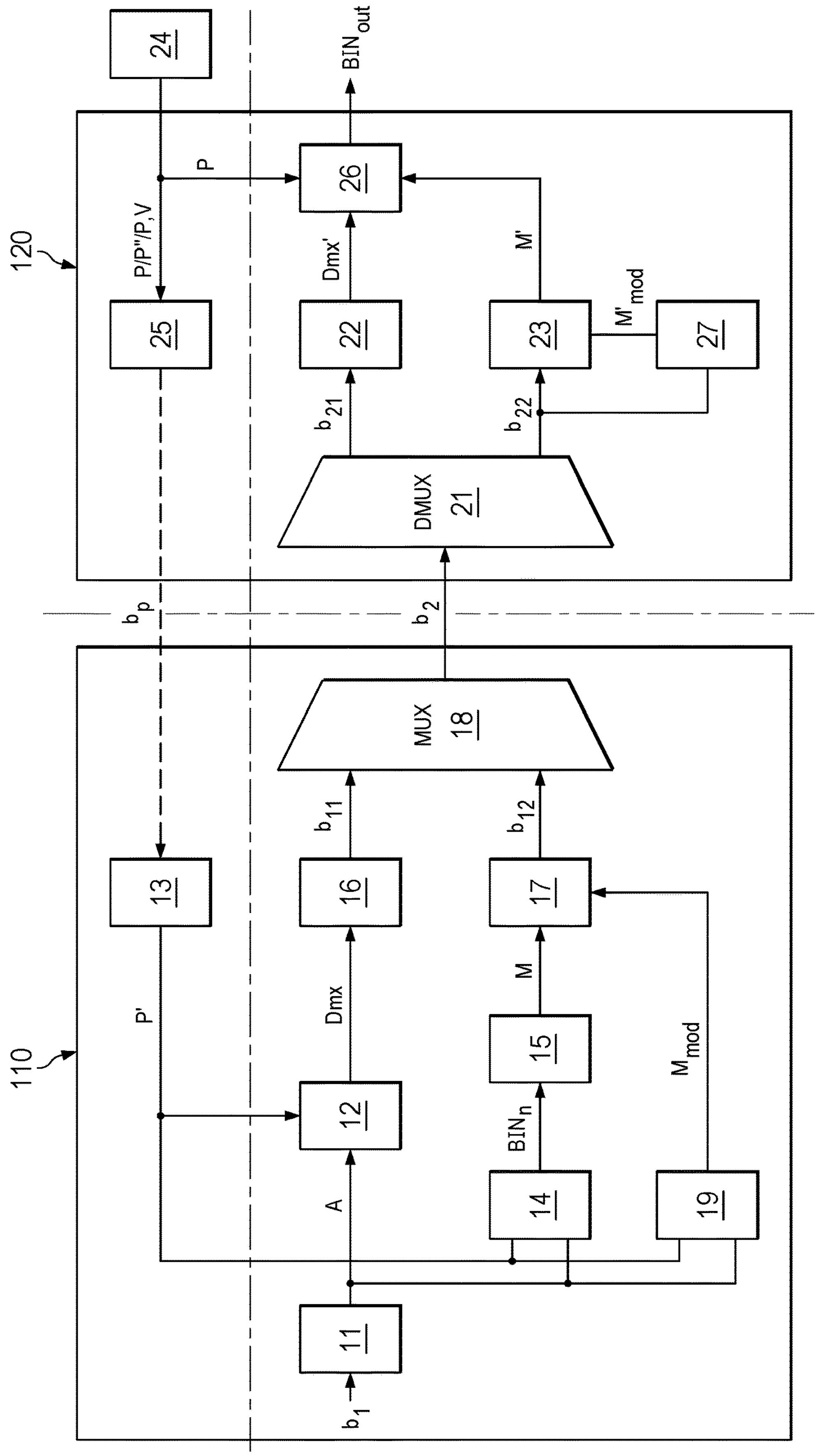
FIG. 4 is a block diagram showing an example of low complexity low bitrate prediction-based split rendering with model-based prediction, in accordance with embodiments of the invention.

FIG. 4 illustrates an example implementation of low-complexity low bitrate prediction based split rendering in accordance with some embodiments.

Elements in FIG. 4 corresponding to these in FIG. 1 have been given identical reference numerals. In addition to these elements, the main device 110 in FIG. 2 includes a modelling block 19, which is configured to provide model-based estimates $M_{mod}$ of the metadata M. Modelling block 19 is configured to receive the immersive audio content A from decoder 11, and the first pose P' from the pose decoder 13, and to responsively generate model-based estimates $M_{mod}$ of the reconstruction metadata M. The model-based estimates $M_{mod}$ are provided to the encoder block 17. Similarly, the lightweight processing device 120 includes a corresponding modelling block 27, which is configured to receive bitstream $b_{22}$ from the demultiplexer 21 and to responsively generate model-based estimates $M'_{mod}$, which are provided to decoder 23.

As depicted in FIG. 4, main device/pre-renderer 110 and lightweight device/post renderer 120 make use of a mathematical model to generate a first model-based estimate $M_{mod}$ or, respectively, $M'_{mod}$ of the predictive metadata parameters. These are estimates of the prediction coefficients mixing matrix $M_p$ for all poses $P_n$. In some embodiments, these are estimates of the prediction coefficients $Pred_L$ and $Pred_R$ for all poses $P_n$. The metadata quantization and coding block may then just encode the residuum between the metadata parameters M and the corresponding model-based estimate $M_{mod}$. Likewise, at the post renderer 120, the predictive metadata parameters M' to be applied in reconstruction block 26 are then the combination of the reconstructed model-based estimate $M'_{mod}$ and the reconstructed residuum.

According to an example of a mathematical model 19, 27 for generating estimates of the predictive metadata, the predictive metadata parameters for a pose P'+X are obtained through facilitating delay and gain/shape operations, which corresponds to the multiplication with complex prediction parameters in complex QMF domain. The input parameters of that model are direction of arrival (DOA) parameters of the dominant sound source in the given QMF band, the azimuth and elevation angles of the poses and possibly respective HRTF (or HRIR or BRIR) coefficients or at least related coefficients. It is notable that the parameters $M_{mod}$ may be coded efficiently through indexing them in a codebook of HRTFs (or related codebook entries).

A further example implementation of low-complexity low bitrate prediction-based split rendering in accordance with some embodiments may rely on a mathematical model of how the metadata parameters evolve when the current head pose P differs by some amount Δ from P'. A more advanced technique compared to the above mentioned linear or triangular interpolation may rely on certain mathematical properties of the parameter evolution. One such property is symmetry. In the related discussion to follow, it is assumed that there is a dominant sound source in a given frequency or QMF band and that the DOA of that source is known. In that case, it is possible to designate the azimuthal angle of that DOA with zero or 180 degrees, meaning that the x-axis of the assumed cartesian coordinate system coincides with the DOA.

For instance, assuming that the HRIRs/BRIRs are left/right symmetrical and that pose P' is aligned with the x-axis (i.e., the azimuth angle is 0 or 180 degrees), the metadata parameters applicable to left and right output channels for an azimuthal pose deviation X are identical to the applicable metadata parameters for swapped output channels (right, left) for a corresponding azimuthal pose deviation of −X.

Moreover, under the given assumptions, the parameters or intermediate parameters from which the metadata parameters are derived may exhibit an odd symmetry relative to the parameters for pose P', i.e., M(P'+4)=−M(P'−Δ) (whereby a possible constant offset is not considered). This symmetry may be exploited if, for instance, the pre-rendering is done assuming an adjusted pose P', which is aligned with the x-axis. The symmetry property will then allow limiting the pre-rendering to the poses P' and P'+X while skipping pre-rendering for P'−X'. This will save the complexity for one rendering operation at the pre-renderer 110 and avoid transmission of metadata parameters for pose P'−X'.

Another case is when (adjusted) pose P' coincides with the y-axis, i.e., pose P' is such that the DOA of the dominant sound source is the left or the right direction. Changing the current head pose by a small amount Δ now means that the sound will virtually arrive from cither slightly front or back but still essentially from the left or the right. A good approximation of this case is that the metadata parameters (or intermediate parameters) now exhibit an even symmetry, i.e., M(P'+X)=M(P'−X).

The symmetry properties may further be exploited when modeling the metadata (or intermediate) parameter evolution as a function of the pose deviation Δ. For instance, this function can be represented as a Taylor series of type:

$$M(P' + \Delta) = M(P') + \sum\nolimits_i a_i \Delta^i \text{ with } a_i = \frac{1}{i!} M^{(i)}(P'),$$

where $M^{(i)}(P')$ denotes the i-th derivative evaluated at point P'.

Further considering the symmetry properties in the Taylor series approach, it may be useful to force the pose P' to coincide with the x-axis or the y-axis, i.e., P' is replaced by an adjusted x- or y-axis aligned pose. In the first case, the even terms (except for i=0) disappear (coefficients $a_{2j}=0$ for any positive integer j). Thus, the modeling with a linear (first-order) term becomes very accurate and, in many cases, higher order terms do not need to be considered. Likewise, if P' coincides with the y-axis, the odd terms disappear due to the even symmetry (coefficients $a_{2j-1}=0$ for any positive integer j). Thus, the modeling with a single second order term becomes very accurate and efficient.

In summary, the described examples making use of symmetry properties may reduce the need to pre-render at 3 poses P', P'+X and P'−X' or at least reduce the amount of metadata to be transmitted. Effectively, rather than transmitting the metadata for P'+X and P'−X, it may be more efficient to transmit Taylor series coefficients and DOA angles to indicate the direction of the dominant sound.

Another mathematical property of the metadata parameters (or intermediate parameters) is 360° periodicity with respect to the azimuth angle:

$$M(P)=M(P+360°).$$

The interaural time differences for a rendered plane wave signal incident from a given azimuth angle α can be modeled by a sinusoidal expression as follows:

$$\Delta\text{LR} = -\frac{1}{e} d_e \sin(\alpha),$$

with $d_e$: interaural distance and c: speed of sound.

The interaural level differences can also be approximately modelled with a similar expression.

Thus, a possible approximation of the metadata (or intermediate) parameters involves applying a corresponding sinusoidal formulation. In a more general sense, these parameters can efficiently be represented by a few low-order harmonics of a discrete Fourier series:

$$M(P) = \Sigma_{k=0}^{K} c_k e^{j2\pi k \frac{P}{360}},$$

where, e.g., K=2.

In this expression the $0^{th}$ order term represents a constant (offset), while the first- and second- (and higher-) order sinusoids model the specific periodic metadata parameter evolution. The coefficients $c_k$ are generally complex valued and may for instance depend on the first head pose P' and the DOA of a dominant sound direction as well as on other parameters such as the interaural distance of the assumed listener head. According to the model-based approach outlined above, the coefficients are determined at the pre-renderer 10, applied to generate approximate metadata parameters $M_{mod}$, quantized, coded and then transmitted to the post-renderer that decodes and applies them in its model.

A further embodiment is to rely only on the model. In that case, the main/pre-renderer device 110 may only transmit model parameters and the first head pose to the post-renderer device 20, thereby significantly reducing the amount of transmitted metadata. Coded metadata parameters or residual metadata parameters are not transmitted in that case. The renderer 14 and generator 15 may still be used to generate metadata for poses $P_n$. However, in that case, the generated metadata may merely be used to optimize the accuracy of the model parameters. It is also possible to set N to zero meaning that the renderer 14 will not be used at all. In that case, the model parameters are solely calculated from the received immersive audio content A and associated metadata parameters such as DOA angles that may be part of the received immersive audio signal representation.

It is notable that in the above examples, the letter M may generally represent a metadata parameter of the above defined mixer matrices such as, e.g., prediction gains $Pred_L$ or $Pred_R$) or diffuseness gains $Diff_L$ or $Diff_R$. M may also represent intermediate parameters occurring in the calculation of the metadata parameters such as, e.g., covariances as used in the above embodiments.

Quantization and Coding of Metadata Parameters

Methods of quantizing metadata for prediction-based split rendering technique are described below.

In some example implementations, a main device/pre-render 10 receives immersive audio signal/content A (e.g., output of an immersive decoder such as IVAS, a QMF signal, etc.). The audio content A is converted into downmix signal Dmx (e.g., by downmixer 12) using P'. Main device 10 may receive the pose P' from Light weight device 20 or it may assume P' to be a certain pose value without any indication from light weight device 20. In some embodiments, Dmx has one channel. In some embodiments, Dmx has more than one channel (e.g., two channels).

Renderer 14 generates one or more binaural representations $BIN_n$ from A, the one or more binaural representations corresponding to one or more poses (a set of second poses) poses $P_n$ that are estimated from pose P', where 1≤n≤N and N≥1. A metadata generator (e.g., generator 15) generates metadata M based on the Dmx signal and binaural signals BINn such that any of BINn binaural signals can be reconstructed using Dmx signal and metadata M. Dmx signal is coded by an encoder 16 which generates a bitstream $b_{11}$, Metadata M, including pose P', is quantized and coded (e.g., by encoder 17), generating a bitstream $b_{12}$. Bitstreams $b_{11}$ and $b_{12}$ are combined into bitstream $b_2$ by multiplexer 18.

At the lightweight device/post-renderer 20, $b_2$ is received and separated into $b_{21}$ and $b_{22}$ bitstreams by demultiplexer 21. Bitstream $b_{21}$ is fed to a first decoder 22 which reconstructs Dmx signal and generates a reconstructed downmix representation Dmx' signal. Bitstream $b_{22}$ is fed to a MD decoding and dequantizing (unquant) block (e.g., second decoder 23) which reconstructs the metadata M, including pose P', and generates reconstructed metadata M'. Dmx' and M' are then fed to a binaural reconstruction block 26 which generates head tracked binaural output using Dmx' and metadata M' and current head pose P.

Given that the poses $P_n$ are known to metadata quantizer (encoder 17), it can make few assumptions to quantize the metadata corresponding to these poses more efficiently. The metadata comprises of a rotation matrix such that the binaural signal corresponding to poses $P_n$ can be reconstructed from Dmx signal. An example metadata representation for a case where Dmx signal is a binaural signal ($BIN_{ref}$ signal) that is generated by applying a set of HRTFs (or BRIRs) and pose P' to audio signal A1, is given below $$\begin{bmatrix} z_{l,p}[n] \\ z_{r,p}[n] \end{bmatrix} = M_p \begin{bmatrix} y_{l,p_o}[n] \\ y_{r,p_o}[n] \end{bmatrix} + \begin{bmatrix} |g_{p,p}| \\ g_{p,p} \end{bmatrix} (y_{l,p_o}[n] + y_{r,p_o}[n]) \quad (1)$$

Here, $z_{l,p}$ [n] and $z_{r,p}$ [n] are the $n^{th}$ samples of Left and Right channels of the reconstructed BIN signal as per pose $P_n$. $M_p$ is the (two-by-two) prediction coefficients mixing matrix, $y_{l,p_o}$ [n] and $y_{r,p_o}$ [n] are the $n^{th}$ samples of Left and Right channels of $BIN_{ref}$ signal, $g_{p,p}$ is the decorrelation coefficient. Computation of $M_p$ and $g_{p,p}$ is same as given in U.S. Provisional Application 63/340,181.

Techniques to efficiently quantize and code metadata $M_p$ and $g_{p,p}$ are given below.

Choosing the Origin for Quantization of Metadata Matrices

Depending on the combination of rotation angles in pose $P_n$ and direction of arrival angles in the reference binaural signal, a rotation matrix $M_r$ can be generated which can then be used as the origin for quantizing the $M_p$ matrix such that the quantization points distribution is same on either side of the origin. This allows for fine quantization around rotation matrices $M_r$ and limits the minimum and maximum value that needs to be coded and also limits the number of quantization points. In an example implementation, if one or more poses from $P_n$ are close to the first head pose P' then an identity matrix can be assumed as the origin of quantization.

Furthermore, if azimuth angle (θ) and elevation angle (ϕ) of a source in reference BINref signal is known, then the following rotation matrix can be used as the origin of quantization for azimuth angle (θ+$Ø_n$) if poses $P_n$ only differ by angle $Ø_n$ along yaw axis as compared to the reference pose P':

$$\begin{pmatrix} x & y \\ x' & y' \end{pmatrix}.$$

Here, example values of x, x', y, y' are as follows. x=x'=f*(1+sin θ cos $Ø_n$+cos θ sin $Ø_n$), y=y'=f*(1−sin θ cos $Ø_n$−cos θ sin $Ø_n$) where f is a constant (for e.g., 0.5). If elevation angle (ϕ) of a source in reference $BIN_{ref}$ signal is 90 degrees, then $M_r$ can be assumed to be an identity matrix. In some implementations, for certain values of X, $M_r$ may be approximated without prior knowledge of directional of arrival angles of the source. Example values of x, x', y, y' are as follows x=y'=cos($Ø_n$/2), x'=−sin($Ø_n$/2), y=sin($Ø_n$/2). It is to be noted that if $Ø_n$==0 then the matrix automatically becomes identity matrix.

Use the Symmetry in +X and −X Metadata Matrices for Quantization and Coding

Typically poses $P_n$ are symmetrically placed around the first head pose P'. In an example implementation, if N=2 and P'+X and P'−X are the poses corresponding to which metadata $M_p$, as given in eq (1), is generated. Here, X can be a tuning parameter set based on the expected motion to sound delay of the system. Alternatively, X can be a constant (for e.g., 15 degrees along yaw axis, 0 degrees along pitch axis and 0 degrees along roll axis). If the metadata corresponding to P'+X is computed, then an intermediate metadata corresponding to P'−X can be extrapolated using the first head pose and P'+X pose, which can then be used to efficiently quantize and code the actual metadata of P'−X.

Used the Symmetry in Left and Right Channel Metadata for a Given Pose to Quantize and Code the Metadata The metadata matrix $M_p$ usually has certain symmetry in Left and Right channel entries which can be used to quantize and code the metadata efficiently. One of the symmetries in an example implementation is that the sum of square of the real part of elements of any row or column is assumed to be close to 1. Another symmetry that is used in an example implementation is that element $m_{ij}$ is assumed to be close to $m_{ji}$ for real part of the $M_p$ matrix while $m_{ij}$ is assumed to close to $-m_{ji}$ for imaginary parts of the $M_p$ matrix. These symmetries are used to save quantization points in some implementations. Alternatively, these symmetries are used to do differential coding in which a set of elements of $M_p$ matrix are differentially coded with respect to second set of elements of $M_p$ matrix i.e., the difference between two sets is coded. The difference values are likely to be close to 0 most of the times and can be efficiently coded using entropy coders.

Differential Coding Across Subframes and Subbands

The metadata for binaural channels corresponding to poses $P_n$ may be computed in broadband or banded domain. Moreover, in some implementations it can be coded in subband domain with a CLDFB (Complex Low Delay Filterbank). The time resolution of the metadata computed with CLDFB filterbank can be very less than the time resolution of codec (e.g., IVAS) or renderer. In an example implementation, the time resolution of renderer or codec is 20 ms which is referred to as a frame whereas the time resolution of CLDFB domain metadata is 5 ms which is referred to as subframe. It can be assumed that the metadata does not change very frequently with time and hence the metadata corresponding to one or more subframes in a frame is differentially coded with respect to one or more subframes of the same frame. The subframes of the same frame are used to perform differential coding thereby minimizing the impact of packet loss during transmission of data to light weight device. The difference values that are being coded are likely to be 0 in most of the cases and can be efficiently coded using an entropy coder. In some implementations, it has been realized that the metadata does not change very frequently across frequency and hence the metadata corresponding to one or more frequency bands of a frame are differentially coded with respect to one or more frequency bands of the same frame. The difference values that are being coded are likely to be 0 in most of the cases and can be efficiently coded using an entropy coder.

Variations

Systems and methods disclosed in the present disclosure may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

Figure 5:
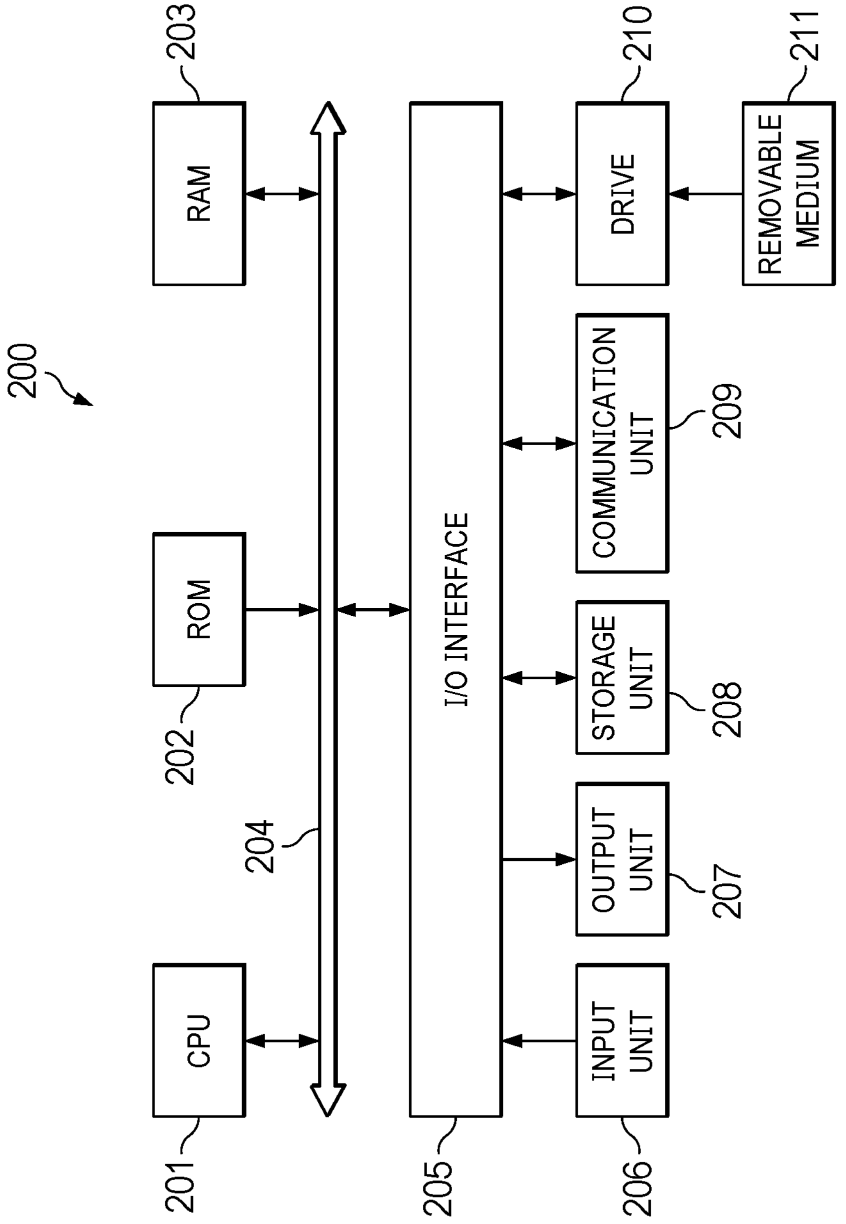
FIG. 5 illustrates a schematic block diagram of an example device or architecture that may be used to implement embodiments of the invention.

FIG. 5 shows a schematic block diagram of an example electronic device or architecture 200 (e.g., an apparatus 200) suitable for implementing example embodiments of the present disclosure. Architecture 200 includes but is not limited to main processing devices and lightweight processing devices as described in relation to FIGS. 1 and 4. As shown, the architecture 200 includes central processing unit (CPU) 201 which is capable of performing various processes in accordance with a program stored in, for example, read only memory (ROM) 202 or a program loaded from, for example, storage unit 208 to random access memory (RAM) 203. The CPU 201 may be, for example, an electronic processor 201, which may include one or more processor cores, and in some examples the processor 201 may be multiple processors. In RAM 203, the data required when CPU 201 performs the various processes is also stored, as required. CPU 201, ROM 202 and RAM 203 are connected to one another via bus 204. Input/output (I/O) interface 205 is also connected to bus 204.

The following components are connected to I/O interface 205: input unit 206, that may include a keyboard, a mouse, or the like; output unit 207 that may include a display such as a liquid crystal display (LCD) and one or more speakers; storage unit 208 including a hard disk, or another suitable storage device; and communication unit 209 which may include a network interface card such as a network card (e.g., wired or wireless).

In some implementations, input unit 206 includes one or more microphones in different positions (depending on the host device) enabling capture of audio signals in various formats (e.g., mono, stereo, spatial, immersive, and other suitable formats).

In some implementations, output unit 207 include systems with various number of speakers. Output unit 207 (depending on the capabilities of the host device) can render audio signals in various formats (e.g., mono, stereo, immersive, binaural, and other suitable formats).

In some embodiments, communication unit 209 is configured to communicate with other devices (e.g., via a network). Drive 210 is also connected to I/O interface 205, as required. Removable medium 211, such as a magnetic disk, an optical disk, a magneto-optical disk, a flash drive or another suitable removable medium is mounted on drive 210, so that a computer program read therefrom is installed into storage unit 208, as required. A person skilled in the art would understand that although apparatus 200 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 209, and/or installed from the removable medium 211, as shown in FIG. 2.

Generally, various example embodiments of the present disclosure may be implemented in hardware or special purpose circuits (e.g., control circuitry), software, logic or any combination thereof. For example, the various elements of FIGS. 1 and 4 discussed above can be executed by control circuitry (e.g., CPU 201 in combination with other components of FIG. 5), thus, the control circuitry may be performing the actions described in this disclosure.

Some aspects may be implemented in hardware, while other aspects may be implemented in firmware or software which may be executed by a controller, a processor and/or other computing device(s), which may include control circuitry. While various aspects of the example embodiments of the present disclosure are illustrated and described as block diagrams, flowcharts, or using some other pictorial representation, it will be appreciated that the blocks, apparatus, systems, techniques, or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

Computer program code for carrying out methods of the present disclosure may be written in any combination of one or more programming languages. These computer program codes may be provided to one or more processors of a general-purpose computer, special purpose computer, or other programmable data processing apparatus that has control circuitry, such that the program codes, when executed by one or more processors of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

The one or more processors may operate as a standalone device or may be connected, e.g., networked to other processor(s). Such a network may be built on various different network protocols, and may be the Internet, a Wide Area Network (WAN), a Local Area Network (LAN), or any combination thereof.

The software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, physical (non-transitory) storage media in various forms, such as ROM, PROM, EPROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media (transitory) typically embodies computer readable instructions, data structures, program modules or other data in a modulated data signal such as a carrier wave or other transport mechanism and includes any information delivery media.

The implementation of the technologies disclosed in the figures are merely illustrative examples, and the invention is not so limited. For example, the illustrated partitions such as blocks in FIGS. 1 and 4 are merely illustrative logical partitions for case of discussion, where such partitions may be split into additional partitions, combined into fewer partitions, supplemented with additional partitions, or reduced by eliminating partitions, without departing from the spirit of the present invention. For the illustrated flow charts of FIG. 2 and FIG. 3, the partitions of the operational steps, which may be also referred to as functions, steps, operations, processes, or acts, may be combined into fewer steps or split into additional steps, where steps may be reordered or eliminated, in whole or in part, without departing from the spirit of this disclosure.

Unless specifically stated otherwise, as apparent from the following discussions, it is appreciated that throughout the disclosure discussions utilizing terms such as “processing”, “computing”, “calculating”, “determining”, “analyzing” or the like, may refer to the function, action, steps and/or processes of a computer hardware or computing system, or similar electronic computing devices, that manipulate and/or transform data represented as physical, such as electronic, quantities into other data similarly represented as physical quantities.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some, but not other, features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with instructions for carrying out such a method or element of a method forms a means for carrying out the method or element of a method. Note that when the method includes several elements, e.g., several steps, no ordering of such elements is implied, unless specifically stated. Furthermore, an element described herein of an apparatus embodiment is an example of a means for carrying out the function performed by the element for the purpose of carrying out the embodiments of the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

The person skilled in the art realizes that the present invention by no means is limited to the preferred embodiments described above. On the contrary, many modifications and variations are possible within the scope of the appended claims. For example, various downmix representations may be employed, other than the ones mentioned above. Further, the number of second head poses may be any number, not necessarily two, like in the example mentioned above.

Various aspects and implementations of the present disclosure may also be appreciated from the following enumerated example embodiments (EEEs), which are not claims.

EEE1. A method of processing audio, comprising:

receiving, by a first device (in some embodiments (ISE), a heavy-weight device, a device with high compute or battery resources (e.g., edge node or network node of a 5G system, a high performance UE, etc.)), an immersive audio (ISE, immersive audio includes audio channels, objects, metadata, or a combination thereof (e.g., a QMF signal, output of an immersive decoder such as IVAS, etc.));

obtaining user pose information (ISE, obtaining user pose information includes receiving or generating or accessing data representing an actual or predicted head orientation or head position of a user of a second device at a first time (e.g., pitch, yaw, or roll angles, location or translation data, etc.). ISE, user pose information is obtained via one or more sensors (e.g., gyroscope, accelerometer, IMU, camera, LiDar, etc.). ISE, the one or more sensors are included in a second device. ISE, the one or more sensors are included in a device different from the second device and different from the first device);

determining, by the first device, from the immersive audio, a downmixed signal including at least one channel (ISE, the downmixed signal is determined based at least in part on the obtained user post information);

determining, by the first device, a set of N (e.g., N≥0) predicted poses based the obtained user pose information (ISE, obtained user pose information represents a head pose of user of a second device at a first time);

determining, by the first device, from the immersive audio, a set of binaural representations corresponding to the set of N predicted poses;

generating, by the first device, from the downmix signal and from at least one of the set of binaural representations and a metadata model, a metadata (ISE, prediction and diffuseness gains); and providing, by the first device to a second device different from the first device (ISE, the second device is a light-weight device, a wearable device (e.g., AR/XR headset, earbuds, head-mounted display, etc.), a device with low compute or battery resources relative the first device, etc.), the downmixed signal and the metadata (ISE, the metadata includes data representing the obtained user pose information).

EEE2. The method of EEE1, wherein obtaining user pose information is performed at least in part by a second device, and further comprising:

providing (e.g., transmitting) data corresponding to the obtained user pose information from the second device to the first device.

EEE3. The method of EEE1 or EEE2, further comprising:

rendering, by a renderer of the second device, the downmixed signal into output binaural audio based at least in part on the metadata, the obtained user pose information, and updated user pose information (ISE, updated user pose information represents a head pose of user of a second device at a second time after the first time. ISE, the updated user pose information is obtained in the same manner as the user pose information is obtained (e.g., via a common set of sensors). ISE, the updated user pose information is obtained in a different manner than the user pose information is obtained (e.g., via distinct set of sensors)).

EEE4. The method of any of EEE1-EEE3, wherein the downmix signal is a binaural signal generated using:

a set of HRTFs or a set of BRIRs; and the obtained user pose information.

EEE5. The method of any of EEE1-EEE4, wherein determining a set of predicted poses includes calculating N poses corresponding to N predicted yaw angles by:

modifying a pose yaw angle derived from the obtained user pose information (ISE, the pose yaw angle is directly encoded in the obtained user pose information. ISE, the pose yaw angle is derived in part from data encoded in the obtained user pose information) a first pre-determined value (e.g., angle specified in degrees or radians) in first direction (e.g., clockwise, anti-clockwise) to obtain a first predicted yaw angle of the N predicted yaw angles.

EEE6. The method of EEE5, further comprising: modifying the pose yaw angle derived from the obtained user pose information by second pre-determined value in a second direction (e.g., anti-clockwise, clockwise) direction to obtain a second predicted yaw angle of N predicted yaw angles. (ISE, the first predetermined value is different from the second predetermined value. ISE, the first predetermined value and the second predetermined value are the same value. ISE, the first direction is different from the second direction. ISE, the first direction and the second direction are the same value)

EEE7. The method of any of EEE5-EEE6, wherein calculating N poses corresponding to N predicted yaw angles further comprises: generating the pose yaw angle derived from the obtained user pose information by modifying a pose yaw angle included in the obtained user pose information based one or more motion data (e.g., angular velocity, acceleration, or deceleration of user's head rotation).

EEE8. The method of any of EEE5-EEE6, wherein the pose yaw angle derived from the user pose information corresponds to an angular yaw value represented in the obtained user pose information.

EEE9. The method of any of EEE1-EEE3 and EEE5-EEE8, wherein the downmix signal is a combination of a prototype signal and zero or more diffused signals.

EEE10. The method of EEE9, wherein the prototype signal and the zero or more diffused signals are created by applying real or complex gains values to a binaural signal generated using a set of HRTFs or BRIRs and the obtained user pose information, and subsequently adding the gain adjusted channels of the binaural signal.

EEE11. The method of EEE10, wherein the real or complex gain values are generated based on the normalized covariance of channels obtained by taking the sum and difference of a binaural signal generated using a set of HRTFs or BRIRs and the obtained user pose information.

EEE12. The method of EEE1-EEE11, wherein the metadata generated by the first device comprises real or complex gains values such that the binaural representations corresponding to predicted poses can be reconstructed by applying the real or complex gain values to the channels of the downmix signal and then adding the gain adjusted channels of the downmix.

EEE13. The method of any of EEE1-EEE12, wherein the binaural representations corresponding to N predicted poses are determined by reusing the HRTF- or BRIR-filtered channels that are not expected to change with a change in pose.

EEE14. The method of any of EEE1-EEE13, wherein generating metadata includes at least one of:

computing prediction gains to predict correlated components in the binaural representations with respect to one or more downmix signals; and computing diffuseness gain parameters to fill in the uncorrelated energy.

EEE15. The method of any of EEE1-EEE14, wherein generating metadata includes metadata quantization and encoding processes.

EEE16. The method of any of EEE3-EEE15, wherein rendering includes metadata dequantization and decoding processes.

EEE17. The method of any of EEE1-EEE16, wherein providing, by the first device to a second device different from the first device, the downmixed signal, and the metadata, includes: encoding the downmix signal;

muxing quantized and coded metadata with the encoded downmix signal into a combined bitstream; and transmitting the combined bitstream to the second device.

EEE18. The method of any of EEE1-EEE17, wherein the metadata includes data corresponding to a reference pose.

EEE19. The method of any of EEE1-EEE18, further comprising, at the second device: receiving a combined bitstream;

demuxing a combined bitstream into data corresponding to the downmix signal and data corresponding the metadata;

decoding the data corresponding to the downmix signal; and decoding and dequantizing the data corresponding to the metadata.

EEE20. The method of any of EEE1-EEE19, wherein a model is used to generate a first estimate of the predictive metadata parameters to be used in metadata quantization/ dequantization and coding/decoding processes and wherein the model generates estimates for a respective pose different from the obtained user pose information (e.g., the received pose from the second device).

EEE21. The method of any of EEE3-EEE20, wherein respective meta data of the metadata provided from the second device to the first device is quantized and coded by the first device using the symmetries n poses, corresponding to the respective metadata being computed, and a reference pose at the first device.

EEE22. The method of EEE21, wherein the symmetries in poses, corresponding to the respective metadata being computed, and a reference pose at the first device are used to quantize and code difference values between a set of parameters such that the overall entropy of parameters to be coded is reduced.

EEE23. A computing apparatus comprising:

- one or more processors; and
- memory storing instructions, which when executed the one or more processors, cause the computing apparatus to perform the methods of any of EEE1-EEE22.

EEE24. A computer program product configured to cause one or more processors to perform the method of any of EEE1-EEE22.

EEE25. A non-transitory computer-readable storage medium storing one or more computer programs configured to be executed by one or more processors of a computing apparatus, the one or more computer programs including instructions for causing the computing apparatus to perform the method of any of EEE1-EEE22.

EEE26. A method of processing audio in a main device (10), the method comprising:

- receiving a first bitstream ($b_1$);
- decoding the first bitstream ($b_1$) to obtain decoded immersive audio content (A);
- receiving a second bitstream ($b_p$);
- decoding the second bitstream ($b_p$) to obtain pose information (P; P"; P, V) associated with a user of a lightweight processing device;
- determining a first head-pose (P') based on the pose information (P; P"; P, V);
- generating a downmix representation (Dmx) of the immersive audio content (A) corresponding to the first head pose (P');
- rendering a set of binaural representations ($BIN_n$) of the immersive audio content (A), wherein the binaural representations correspond to a second set of head poses ($P_n$);
- computing reconstruction metadata (M) to enable reconstruction of the set of binaural representations from the downmix representation (Dmx), the metadata (M) including the first head pose (P');
- encoding the downmix representation (Dmx) and the reconstruction metadata (M) in a third bitstream ($b_2$); and
- outputting the third bitstream ($b_2$).

EEE27. The method of EEE26, wherein the reconstruction metadata includes a two-by-two matrix for each time-frequency tile.

EEE28. The method according to EEE26, further comprising encoding the reconstruction metadata using differential coding between the elements of the two-by-two matrices.

EEE29. The method according to any of EEE26-EEE28, wherein the head poses in the second set of head poses are symmetrically distributed around the first head pose, and further comprising quantizing and encoding the reconstruction metadata based on symmetries in reconstruction metadata relating to the symmetrically distributed head poses.

EEE30. The method according to EEE29, further comprising encoding the reconstruction metadata using differential coding between metadata relating to different symmetrical poses.

EEE31. The method according to any of EEE26-EEE30, further comprising encoding the reconstruction metadata using differential coding between consecutive time frames and/or between adjacent frequency bands.

EEE32. The method according to any of EEE26-EEE31, wherein the pose information includes a head pose (P) detected by the lightweight processing device.

EEE33. The method according to EEE32, wherein the pose information further includes a head velocity (V) detected by the lightweight processing device.

EEE34. The method according to any of EEE26-EEE33, wherein the second set of head poses are determined by adding a set of predefined offsets to the first head pose.

EEE35. The method according to EEE34, wherein the predefined offsets are static.

EEE36. The method according to EEE34, wherein the predefined offsets are dynamically computed based on a latency between the main device and the lightweight processing device.

EEE37. The method according to any of EEE34-EEE36, further including encoding the set of pre-defined offsets and including them in the third bitstream.

EEE38. The method according to any of EEE26-EEE37, wherein the downmix representation is a first binaural representation corresponding to the first head pose, and wherein said reconstruction metadata is pose correction metadata enabling reconstruction of said set of binaural representations from the first binaural representation.

EEE39. The method according to any of EEE26-EEE38, wherein the downmix representation includes a mono signal (S) formed by a combination of channels in a multichannel representation of the immersive audio content; and

- wherein the reconstruction metadata enables reconstruction of said set of binaural representations from said prototype signal, S.

EEE40. The method according to EEE39, wherein the multichannel representation is a first binaural representation.

EEE41. The method according to EEE38 or EEE39, wherein the reconstruction metadata includes a two-by-two matrix for each time-frequency tile, allowing reconstruction of said set of binaural representations from said mono signal (S) and a decorrelated version of the prototype signal.

EEE42. The method according to EEE40, wherein the entries of the two-by-two matrix are computed as:

$$Pred_L = \frac{\mathrm{Cov}_{SL}}{\mathrm{Cov}_{SS}}, Pred_R = \frac{\mathrm{Cov}_{SR}}{\mathrm{Cov}_{SS}}$$

$$Diff_L = sqrt\left(\frac{\max(0, \mathrm{real}(Res_{LL}))}{\mathrm{Cov}_{ss}}\right),$$

$$Diff_R = sqrt\left(\frac{\max(0, \mathrm{real}(Res_{RR}))}{\mathrm{Cov}_{ss}}\right),$$

wherein $\mathrm{Cov}_{SL}$ is the covariance between the prototype signal (S) and the left channel of a particular binaural representation, $\mathrm{Cov}_{SR}$ is the covariance between the mono signal (S) and the right channel of the particular binaural representation, $\mathrm{Cov}_{SS}$ is the variance of the mono signal S, $\mathrm{Cov}_{RR}$ is the variance of the right channel, $Cov_{LL}$ is the variance of the left channel, $Res_{RR}=Cov_{RR}-Pred_R^2*Cov_{SS}$, $Res_{LL}=Cov_{LL}-Pred_L^2*Cov_{SS}$ EEE43. The method according to EEE39, wherein the downmix representation further includes a diffused signal (D) formed as a combination of diffused components of the multichannel representation of the immersive audio content, and wherein the reconstruction metadata includes a two-by-two matrix for each time frame and each frequency band allowing reconstruction of said set of binaural representations from said mono signal (S) and said diffused signal (D).

EEE44. The method according to EEE42, wherein the entries of the two-by-two matrix are computed as:

$$Pred_L = \frac{Cov_{SL}}{Cov_{SS}},\ Pred_R = \frac{Cov_{SR}}{Cov_{SS}},$$

$$Diff_L = sqrt\left(\frac{\max(0, \mathrm{real}(Res_{LL}))}{Cov_{DD}}\right),$$

$$Diff_R = sqrt\left(\frac{\max(0, \mathrm{real}(Res_{RR}))}{Cov_{DD}}\right)$$

wherein $Cov_{SL}$ is the covariance between the mono signal S and the left channel of a particular binaural representation, $Cov_{SR}$ is the covariance between the mono signal (S) and the right channel of a particular binaural representation, $Cov_{SS}$ is the variance of the mono signal S, $Cov_{DD}$ is the variance of the diffused signal (D), $Cov_{RR}$ is the variance of the right channel, $Cov_{LL}$ is the variance of the left channel, $Res_{RR}=Cov_{RR}-Pred_R^2*Cov_{SS}$, and $Res_{LL}=Cov_{LL}-Pred_L^2*Cov_{SS}$.

EEE45. An apparatus comprising a processor and a memory coupled to the processor, wherein the processor is adapted to cause the apparatus to carry out the method according to any of EEE26-EEE45.

EEE46. A computer-readable storage medium storing a program comprising instructions that, when executed by a processor, cause the processor to carry out the method according to any of EEE26-EEE44.

EEE47. A method of processing audio in a lightweight processing device (20), comprising:

receiving a bitstream ($b_2$) from a main device;

decoding the bitstream to obtain:

a downmix representation (Dmx') of an immersive audio content (A), the downmix representation being associated with a first head pose (P') and first reconstruction metadata (M') enabling reconstruction of a set of binaural representations ($BIN_n$) from said downmix presentation, said set of binaural representations being associated with a set of second head poses ($P_n$), the reconstruction metadata (M') including the first head pose (P');

obtaining the set of second head poses ($P_n$) with which the first reconstruction metadata is associated;

detecting a current head pose (P) of a user of the lightweight processing device;

transmitting the current head pose to the main device; and reconstructing output binaural audio ($BIN_{out}$) based on the downmixed presentation (Dmx'), the first reconstruction metadata (M'), the second set of head poses ($P_n$), and a relationship between the first head pose (P') and the current head pose (P).

EEE48. The method according to EEE47, wherein the lightweight processing device obtains the second set of head poses by adding a set of offsets to the first head pose.

EEE49. The method according to EEE48, wherein the lightweight processing device has prior knowledge of the set of offsets.

EEE50. The method according to EEE48, wherein the lightweight processing device obtains the set of offsets from the bitstream.

EEE51. The method according to any of EEE47-EEE50, wherein the first reconstruction metadata includes a two-by-two matrix for each time-frequency tile.

EEE52. The method according to any of EEE47-EEE50, further comprising computing second reconstruction metadata by performing linear interpolation or extrapolation on the first reconstruction metadata based on the second set of head poses and the relationship between the current head pose and the first head pose.

EEE53. The method according to any of EEE47-EEE52, wherein the downmix representation is a first binaural representation corresponding to the first head pose (P'), and wherein said reconstruction metadata is pose correction metadata enabling reconstruction of a set of binaural representations from the first binaural representation.

EEE54. The method according to any of EEE47-EEE52, wherein the downmix representation includes a mono signal (S) formed by a combination of channels in a multichannel representation of the immersive audio content; and wherein the reconstruction metadata enables reconstruction of said set of binaural representations from said mono signal (S).

EEE55. The method according to EEE54, wherein the multichannel representation is a first binaural representation.

EEE56. The method according to any of EEE54-EEE55, further comprising:

obtaining a decorrelated version of said mono signal using a decorrelator function, wherein the first reconstruction metadata includes a two-by-two matrix for each time frame and each frequency band allowing reconstruction of said set of binaural representations from said mono signal (S), and said decorrelated version of the mono signal.

EEE57. The method according to any of EEE54-EEE55, wherein the downmix representation further includes a diffused signal (D), associated with the mono signal (S), and wherein the first reconstruction metadata includes a two-by-two matrix for each time frame and each frequency band allowing reconstruction of said set of binaural representations from said mono signal, S, and said diffused signal (D).

EEE58. A computer-readable storage medium storing a program comprising instructions that, when executed by a processor, cause the processor to carry out the method according to any of EEE47-EEE57.

EEE59. A main device (10), comprising:

a first decoder (11) for decoding a first bitstream ($b_1$) to obtain decoded immersive audio content (A);

a second decoder (13) for decoding a second bitstream ($b_p$) to obtain pose information relating to a user of a lightweight processing device, and for determining a first head-pose (P') based on the pose information;

a downmixer (12) for generating a downmix representation, Dmx, of said immersive audio content (A) corresponding to the first head pose (P');

a renderer (14) for rendering a set of binaural representations of said immersive audio content, said binaural representations corresponding to a second set of poses;

a metadata generator (15) for computing reconstruction metadata (M) enabling reconstruction of said set of binaural representations ($BIN_n$) from the downmix representation, the metadata (M) including the first head pose (P');

an encoder (17) for encoding the downmix representation (Dmx) and the reconstruction metadata (M) into a third bitstream ($b_2$); and an interface (18) for outputting the third bitstream ($b_2$).

EEE60. A lightweight processing device (20), comprising:

a decoder (22, 23) for decoding a bitstream ($b_2$) from a main device to obtain a downmix representation (Dmx') of an immersive audio content, the downmix representation being associated with a first head pose (P') and first reconstruction metadata (M') enabling reconstruction of a set of binaural representations ($BIN_n$) from said downmix presentation, said set of binaural representations being associated with a set of second head poses ($P_n$), the reconstruction metadata (M') including the first head pose (P');

a head-tracker (24) for detecting a current head pose (P) of a user of the lightweight processing device;

a second encoder (25) for encoding and transmitting the current head pose (P) to the main device; and a binaural reconstruction block (26) for reconstructing output binaural audio based on the downmixed presentation, the first reconstruction metadata, the second set of head poses ($P_n$), and a relationship between the first head pose (P') and the current head pose (P).

EEE61. A split device binaural rendering system including:

a main device (10) according to EEE59, and a lightweight processing device (20) according to EEE60, wherein the interface (18) is configured to transmit the third bitstream ($b_2$) to the lightweight processing device (20).

The invention claimed is:

1. A method of processing audio in a main device, the method comprising:

receiving a first bitstream ($b_1$);

decoding the first bitstream ($b_1$) to obtain decoded immersive audio content (A);

receiving a second bitstream ($b_p$);

decoding the second bitstream ($b_p$) to obtain pose information (P; P"; P, V) associated with a user of a lightweight processing device;

determining a first head-pose (P') based on the pose information (P; P"; P, V);

generating a downmix representation (Dmx) of the immersive audio content (A) corresponding to the first head pose (P');

rendering a set of binaural representations ($BIN_n$) of the immersive audio content (A), wherein the binaural representations correspond to a second set of head poses ($P_n$);

computing reconstruction metadata (M) to enable reconstruction of the set of binaural representations from the downmix representation (Dmx), the metadata (M) including the first head pose (P');

encoding the downmix representation (Dmx) and the reconstruction metadata (M) in a third bitstream ($b_2$); and outputting the third bitstream ($b_2$).

2. A non-transitory computer-readable storage medium storing a program comprising instructions that, when executed by a processor, cause the processor to carry out the method according to claim 1.

* * * * *